United States Patent
Sutou et al.

(10) Patent No.: US 10,654,406 B2
(45) Date of Patent: May 19, 2020

(54) VEHICLE ILLUMINATION SYSTEM AND VEHICLE

(71) Applicant: KOITO MANUFACTURING CO., LTD., Tokyo (JP)

(72) Inventors: Norihisa Sutou, Shizuoka (JP); Masaaki Nakabayashi, Shizuoka (JP); Yoshinori Shibata, Shizuoka (JP); Ryuho Sato, Shizuoka (JP); Naoki Tatara, Shizuoka (JP); Akinori Matsumoto, Shizuoka (JP); Kiyomi Akachi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/277,762

(22) Filed: Feb. 15, 2019

(65) Prior Publication Data
US 2019/0248276 A1    Aug. 15, 2019

(30) Foreign Application Priority Data

Feb. 15, 2018    (JP) ................................ 2018-025175

(51) Int. Cl.
    *B60Q 1/34*      (2006.01)
    *B60W 30/18*      (2012.01)

(52) U.S. Cl.
    CPC ....... *B60Q 1/346* (2013.01); *B60W 30/18163* (2013.01)

(58) Field of Classification Search
CPC combination set(s) only.
See application file for complete search history.

(56) References Cited

U.S. PATENT DOCUMENTS

| | | | |
|---|---|---|---|
| 8,531,285 B2 * | 9/2013 | Purks | B60Q 1/38 340/435 |
| 10,053,001 B1 * | 8/2018 | Nabbe | B60Q 1/346 |
| 2013/0010484 A1 * | 1/2013 | Son | B60Q 1/346 362/464 |
| 2017/0101147 A1 * | 4/2017 | Hasegawa | B60Q 1/44 |
| 2017/0240098 A1 * | 8/2017 | Sweeney | B60Q 1/2611 |
| 2018/0334089 A1 * | 11/2018 | Huang | B60Q 1/346 |

FOREIGN PATENT DOCUMENTS

JP      H09-277887 A      10/1997

\* cited by examiner

*Primary Examiner* — Travis R Hunnings
(74) *Attorney, Agent, or Firm* — Osha Liang LLP

(57) ABSTRACT

A vehicle illumination system provided to a vehicle capable of traveling in an autonomous driving mode includes: an illumination unit configured to emit a light pattern toward an outside of the vehicle; and an illumination controller configured to control the illumination unit to irradiate the light pattern to a predetermined position. When the vehicle changes a traffic lane from a first traffic lane to a second traffic lane, the illumination controller: controls the illumination unit to irradiate the light pattern on a road surface between a first other vehicle traveling on the second traffic lane and a second other vehicle which is a following vehicle of the first other vehicle; and changes a length of the light pattern, depending on an interval between the first other vehicle and the second other vehicle.

8 Claims, 11 Drawing Sheets

VEHICLE ILLUMINATION SYSTEM AND VEHICLE

CROSS-REFERENCE TO RELATED APPLICATION

This application is based on and claims priority under 35 USC 119 from Japanese Patent Application No. 2018-025175 filed on Feb. 15, 2018, the contents of which are incorporated herein by reference.

TECHNICAL FIELD

The present disclosure relates to a vehicle illumination system. In particular, the present disclosure relates to a vehicle illumination system provided to a vehicle capable of traveling in an autonomous driving mode. Also, the present disclosure relates to a vehicle including the vehicle illumination system.

BACKGROUND

Currently, research on an autonomous driving technology of an automobile has been actively conducted in countries, and the countries are considering the legislation so as to enable a vehicle (hereinafter, a "vehicle" refer to an automobile) to travel in an autonomous driving mode on public roads. Here, in the autonomous driving mode, a vehicle system autonomously controls traveling of a vehicle. Specifically, in the autonomous driving mode, the vehicle system autonomously performs at least one of a steering control (control of a traveling direction of the vehicle), a brake control and an accelerator control (control of braking and acceleration/deceleration of the vehicle) based on information (surrounding environment information) indicative of a surrounding information of the vehicle and obtained from sensors such as a camera, a radar (for example, a laser radar or a millimeter wave radar) and the like. On the other hand, in a manual driving mode to be described later, a driver controls the traveling of the vehicle, as in most of conventional vehicles. Specifically, in the manual driving mode, the traveling of the vehicle is controlled in conformity with a driver's operation (a steering operation, a braking operation, and an accelerator operation), and the vehicle system does not autonomously perform the steering control, the brake control and the accelerator control. The driving mode of the vehicle is not a concept existing only in some vehicles but a concept existing in all vehicles including conventional vehicles having no autonomous driving function. For example, the driving mode of the vehicle is classified in accordance with a vehicle control method or the like.

Thus, in the future, it is expected that vehicles traveling in the autonomous driving mode (hereinafter, appropriately referred to as "autonomous driving vehicle") and vehicles traveling in the manual driving mode (hereinafter, appropriately referred to as "manual driving vehicle") coexist on public roads.

As an example of the autonomous driving technology, Patent Document 1 (Japanese Patent Application Laid-Open Publication No. H09-277887) discloses an autonomous follow-up traveling system in which a following vehicle autonomously follows a preceding vehicle. In the autonomous follow-up traveling system, each of the preceding vehicle and the following vehicle has an illumination system, character information for preventing the other vehicle from intruding between the preceding vehicle and the following vehicle is displayed on the illumination system of the preceding vehicle, and character information indicative of the autonomous follow-up traveling mode is displayed on the illumination system of the following vehicle.

In an autonomous driving society where the autonomous driving vehicles travel everywhere on the roads, it is expected that visual communication between a vehicle and the other vehicle outside the vehicle will be more important.

In particular, it is thought that visual inter-vehicle communication is more important when the vehicle changes traffic lanes (upon the change of the traffic lanes). In this respect, when the visual inter-vehicle communication is not sufficient, the vehicle may not smoothly change the traffic lanes. Like this, there is room for further consideration of the visual inter-vehicle communication upon the change of the traffic lanes.

The present disclosure is aimed at providing a vehicle illumination system and a vehicle capable of implementing rich visual communication between vehicles upon change of traffic lanes.

SUMMARY

A vehicle illumination system related to one aspect of the present disclosure and provided to a vehicle capable of traveling in an autonomous driving mode includes: an illumination unit configured to emit a light pattern toward an outside of the vehicle; and an illumination controller configured to control the illumination unit to irradiate the light pattern to a predetermined position. When the vehicle changes a traffic lane from a first traffic lane to a second traffic lane, the illumination controller: controls the illumination unit to irradiate the light pattern on a road surface between a first other vehicle traveling on the second traffic lane and a second other vehicle which is a following vehicle of the first other vehicle; and changes a length of the light pattern, depending on an interval between the first other vehicle and the second other vehicle.

Provided is a vehicle including a vehicle illumination system and capable of traveling in an autonomous driving mode. The vehicle illumination system includes: an illumination unit configured to emit a light pattern toward an outside of the vehicle; and an illumination controller configured to control the illumination unit to irradiate the light pattern to a predetermined position. When the vehicle changes a traffic lane from a first traffic lane to a second traffic lane, the illumination controller: controls the illumination unit to irradiate the light pattern on a road surface between a first other vehicle traveling on the second traffic lane and a second other vehicle which is a following vehicle of the first other vehicle; and changes a length of the light pattern, depending on an interval between the first other vehicle and the second other vehicle.

It becomes possible to provide a vehicle illumination system and a vehicle capable of implementing rich visual communication between vehicles upon change of traffic lanes.

BRIEF DESCRIPTION OF DRAWINGS

Exemplary embodiments of the present invention will be described in detail based on the following figures, wherein.

DETAILED DESCRIPTION

Figure 1:
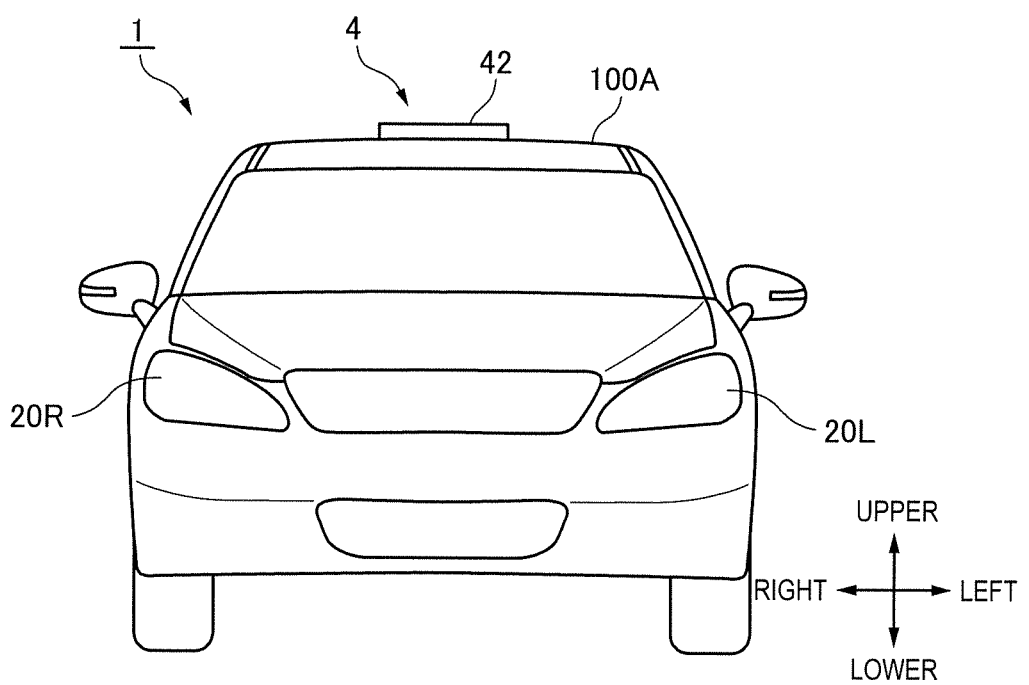
FIG. 1 is a front view of a vehicle having a vehicle illumination system in accordance with an illustrative embodiment of the present disclosure (hereinafter, simply referred to as 'illustrative embodiment')

Hereinafter, an illustrative embodiment of the present disclosure (hereinafter, referred to as 'illustrative embodiment') will be described with reference to the drawings. For the sake of convenience of description, dimensions of the respective members shown in the drawings may be different from actual dimensions of the respective members.

Also, in the description of the illustrative embodiment, for the sake of convenience of description, "the right and left direction", "the upper and lower direction" and "the front and rear direction" will be appropriately mentioned. The directions are relative directions set with respect to a vehicle 1 shown in FIG. 1. Here, "the right and left direction" is a direction including "the rightward direction" and "the leftward direction". "The upper and lower direction" is a direction including "the upward direction" and "the downward direction". "The front and rear direction" is a direction including "the forward direction" and "the rearward direction". Although not shown in FIG. 1, the front and rear direction is a direction perpendicular to the right and left direction and the upper and lower direction.

Figure 2:
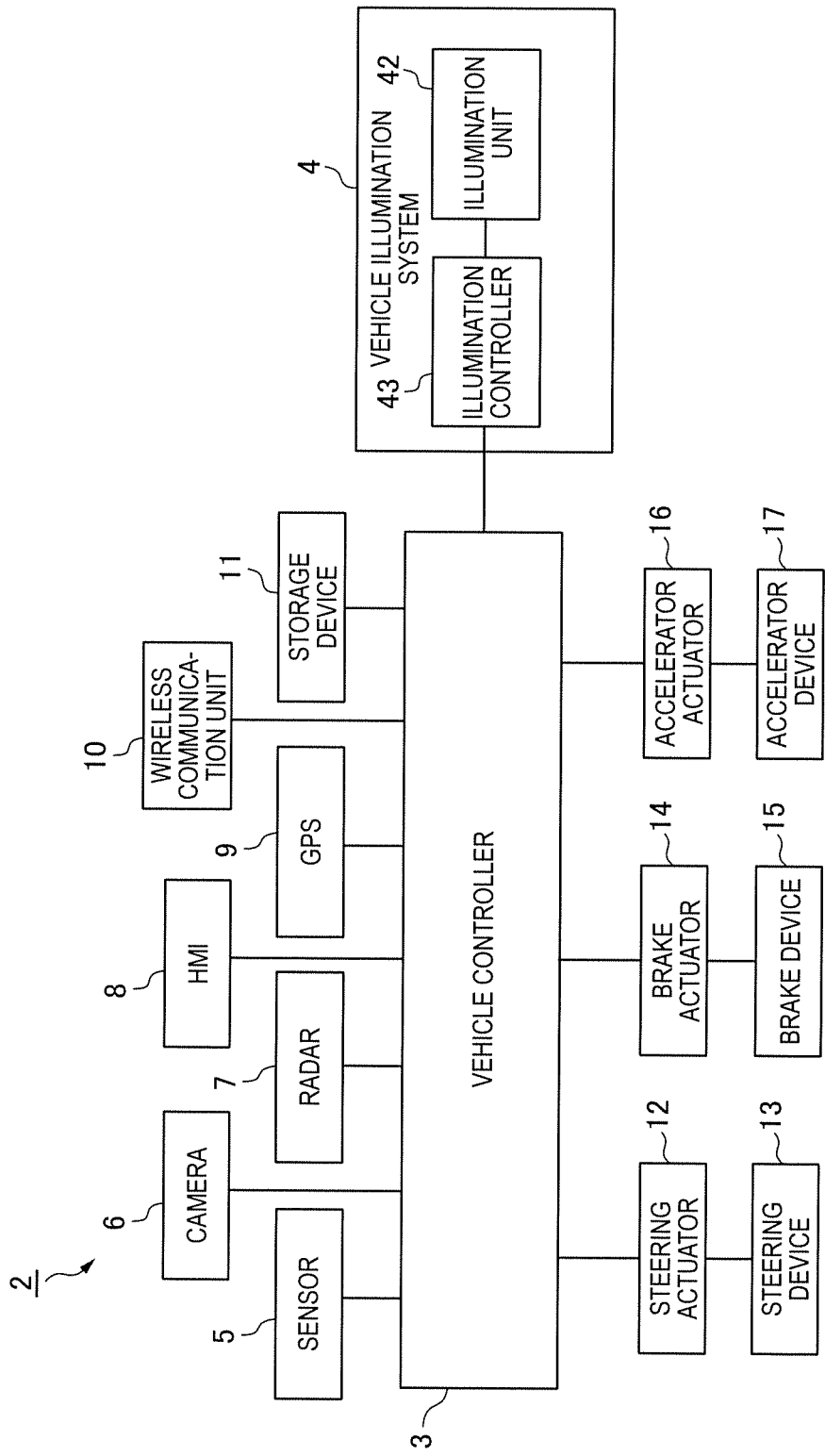
FIG. 2 is a block diagram depicting a vehicle system of the illustrative embodiment.

First, a vehicle system 2 of the illustrative embodiment is described with reference to FIGS. 1 and 2. FIG. 1 is a front view of the vehicle 1 having the vehicle system 2 mounted thereto. FIG. 2 is a block diagram of the vehicle system 2. The vehicle 1 is a vehicle (automobile) capable of traveling in an autonomous driving mode.

As shown in FIG. 2, the vehicle system 2 includes a vehicle controller 3, a vehicle illumination system 4 (hereinafter, simply referred to as "illumination system 4"), a sensor 5, a camera 6, and a radar 7. Also, the vehicle system 2 includes an HMI (Human Machine Interface) 8, a GPS (Global Positioning System) 9, a wireless communication unit 10, a storage device 11, a steering actuator 12, a steering device 13, a brake actuator 14, a brake device 15, an accelerator actuator 16, and an accelerator device 17.

The vehicle controller 3 is configured to control traveling of the vehicle 1. The vehicle controller 3 is configured by, for example, at least one an electronic control unit (ECU). The electronic control unit includes a computer system (for example, SoC (System on a Chip) and the like) having one or more processors and one or more memories, and an electronic circuit having an active element such as a transistor and a passive element. The processor includes at least one of a CPU (Central Processing Unit), an MPU (Micro Processing Unit), a GPU (Graphics Processing Unit) and a TPU (Tensor Processing Unit), for example. The CPU may be configured by a plurality of CPU cores. The GPU may be configured by a plurality of GPU cores. The memory includes a ROM (Read Only Memory) and a RAM (Random Access Memory). In the ROM, a vehicle control program may be stored. For example, the vehicle control program may include an artificial intelligence (AI) program for autonomous driving. The AI program is a program established by a supervised or unsupervised machine learning (particularly, deep learning) using a multi-layered neural network. In the RAM, the vehicle control program, vehicle control data and/or surrounding environment information indicative of a surrounding environment of the vehicle may be temporarily stored. The processor may be configured to develop, on the RAM, a program designated from the diverse vehicle control programs stored in the ROM and to execute a variety of processes in cooperation with the RAM. Also, the computer system may be configured by a non-Neumann type computer such as an ASIC (Application Specific Integrated Circuit), an FPGA (Field-Programmable Gate Array) and the like. Also, the computer system may be configured by a combination of a Neumann type computer and a non-Neumann type computer.

The illumination system 4 includes an illumination unit 42 and an illumination controller 43. The illumination unit 42 is configured to emit a light pattern (for example, refer to FIG. 7 and the like) to an outside of the vehicle 1 by using laser light. As shown in FIG. 1, the illumination unit 42 is arranged on a vehicle body roof 100A of the vehicle 1, for example.

The illumination unit 42 includes a laser light source configured to emit laser light, a light deflection device configured to deflect the laser light emitted from the laser light source, and an optical member such as a lens, for example. The laser light source is an RGB laser light source configured to emit red laser light, green laser light and blue laser light, respectively, for example. The light deflection device is a MEMS (Micro Electro Mechanical Systems) mirror, a galvano mirror, a polygon mirror and the like. The illumination unit 42 is configured to draw a light pattern on a road surface by scanning the laser light, as described later. When the laser light source is the RGB laser light source, the illumination unit 42 can draw a light pattern of diverse colors on the road surface.

In the meantime, in the illustrative embodiment, the single illumination unit 42 is arranged on the vehicle body roof 100A. However, the number, arrangement, shape and the like of the illumination unit 42 are not particularly limited inasmuch as the illumination unit 42 can draw the light pattern on the road surface. For example, when the two illumination units 42 are provided, one of the two illumination units 42 may be mounted in a left-side headlamp 20L and the other of the two illumination units 42 may be mounted in a right-side headlamp 20R. Also, when the four illumination units 42 are provided, the illumination unit 42 may be respectively mounted in the left-side headlamp 20L, the right-side headlamp 20R, a left-side rear combination lamp (not shown) and a right-side rear combination lamp (not shown). Also, in the illustrative embodiment, a raster scan manner is adopted as the drawing manner of the illumination unit 42. However, the illustrative embodiment is not limited thereto. For example, the drawing manner of the illumination unit 42 may be a DLP (Digital Light Processing) manner or an LCOS (Liquid Crystal on Silicon) manner. In this case, an LED may be used as the light source, instead of the laser.

The illumination controller 43 is configured to control the illumination unit 42 to irradiate a light pattern to a predetermined position. Also, as described later, when the vehicle 1 traveling on a merging traffic lane changes the traffic lane from the merging traffic lane to a main traffic lane, the illumination controller 43 changes a length of the light pattern, depending on an interval between the two other vehicles traveling on the main traffic lane. The illumination controller 43 is configured to control drive of the illumination unit 42 and includes an electronic control unit (ECU). The electronic control unit includes a computer system (for example, SoC and the like) having one or more processors and one or more memories, a laser light source control circuit (analog processing circuit) configured to control drive of the laser light source of the illumination unit 42, and a light deflection device control circuit (analog processing circuit) configured to control drive of the light deflection device of the illumination unit 42. The processor includes at least one of a CPU, an MPU, a GPU and a TPU. The memory includes a ROM and a RAM. Also, the computer system may be configured by a non-Neumann type computer such as an ASIC, an FPGA and the like. In the illustrative embodiment, the vehicle controller 3 and the illumination controller 43 are provided as separate configurations. However, the vehicle controller 3 and the illumination controller 43 may be integrally configured. In this respect, the illumination controller 43 and the vehicle controller 3 may be configured by a single electronic control unit.

For example, the computer system of the illumination controller 43 is configured to specify a light pattern to be irradiated to the outside of the vehicle 1, and to transmit a signal indicative of the specified light pattern to the laser light source control circuit and the light deflection device control circuit. The laser light source control circuit is configured to generate a control signal for controlling the drive of the laser light source, based on the signal indicative of the light pattern, and to transmit the generated control signal to the laser light source of the illumination unit 42. In the meantime, the light deflection device control circuit is configured to generate a control signal for controlling the drive of the light deflection device, based on the signal indicative of the light pattern, and to transmit the generated control signal to the light deflection device of the illumination unit 42. In this way, the illumination controller 43 can control the drive of the illumination unit 42.

The sensor 5 includes an acceleration sensor, a speed sensor, a gyro sensor, and the like. The sensor 5 is configured to detect a traveling condition of the vehicle 1 and to output traveling condition information to the vehicle controller 3. The sensor 5 may further include a seating sensor configured to detect whether a driver is sitting on a driver seat, a face direction sensor configured to detect a direction of a driver's face, an external weather sensor configured to detect an external weather condition, a passenger detection sensor configured to detect whether there is a passenger in a vehicle, and the like.

The camera 6 is, for example, a camera including an imaging device such as a CCD (Charge-Coupled Device) and a CMOS (complementary MOS). The camera 6 is configured to acquire image data indicative of a surrounding environment of the vehicle 1 and to transmit the image data to the vehicle controller 3. The vehicle controller 3 is configured to acquire the surrounding environment information, based on the transmitted image data. Here, the surrounding environment information may include information about a target object (a pedestrian, the other vehicle, a marker and the like) existing at the outside of the vehicle 1. For example, the surrounding environment information may include information about attributes of the target object existing at the outside of the vehicle 1, and information about a distance and a position of the target object relative to the vehicle 1. The camera 6 may be configured as a monocular camera or a stereo camera.

The radar 7 includes at least one of a millimeter wave radar, a microwave radar and a laser radar (for example, LiDAR). For example, the LiDAR unit is configured to detect the surrounding environment of the vehicle 1. In particular, the LiDAR unit is configured to acquire 3D mapping data (point group data) indicative of the surrounding environment of the vehicle 1 and to transmit the 3D mapping data to the vehicle controller 3. The vehicle controller 3 is configured to specify the surrounding environment information, based on the transmitted 3D mapping data.

The HMI 8 includes an input unit configured to receive an input operation from a driver and an output unit configured to output the traveling information and the like toward the driver. The input unit includes a steering wheel, an accelerator pedal, a brake pedal, a driving mode changeover switch for switching the driving mode of the vehicle 1, and the like. The output unit is a display for displaying a variety of traveling information. The GPS 9 is configured to acquire current position information of the vehicle 1 and to output the acquired current position information to the vehicle controller 3.

The wireless communication unit 10 is configured to receive information (for example, traveling information, and the like) relating to other vehicles around the vehicle 1 from the other vehicles and to transmit information (for example, traveling information, and the like) relating to the vehicle 1 to the other vehicles (inter-vehicle communication). Also, the wireless communication unit 10 is configured to receive infrastructure information from the infrastructure equipment such as a traffic light, a marker lamp and the like and to transmit the traveling information of the vehicle 1 to the infrastructure equipment (road-to-vehicle communication). Also, the wireless communication unit 10 is configured to receive information relating to a pedestrian from a portable electronic device (a smart phone, a tablet, a wearable device, and the like) carried by the pedestrian and to transmit the host vehicle traveling information of the vehicle 1 to the portable electronic device (pedestrian-to-vehicle communication). The vehicle 1 may be configured to perform communication with the other vehicle, the infrastructure equipment or the portable electronic device by an ad hook mode directly or via an access point. Also, the vehicle 1 may be configured to perform communication with the other vehicle, the infrastructure equipment or the portable electronic device via a communication network (not shown). The wireless communication standards include, for example, Wi-Fi (registered trademark), Bluetooth (registered trademark), ZigBee (registered trademark), LPWA, DSRC (registered trademark) or Li-Fi. Also, the vehicle 1 may be configured to perform communication with the other vehicle, the infrastructure equipment or the portable electronic device via a fifth generation (5G) mobile communication system.

The storage device 11 is an external storage device such as a hard disc drive (HDD), an SSD (Solid State Drive) and the like. In the storage device 11, the 2D or 3D map information and/or the vehicle control program may be stored. For example, the 3D map information may be configured by the point group data. The storage device 11 is configured to output the map information and the vehicle control program to the vehicle controller 3, in response to a request from the vehicle controller 3. The map information and the vehicle control program may be updated via the wireless communication unit 10 and the communication network. The communication network includes at least one of the Internet, a local area network (LAN), a WAN (WAN) and a wireless access network (RAN).

When the vehicle 1 travels in an autonomous driving mode, the vehicle controller 3 autonomously generates at least one of a steering control signal, an accelerator control signal and a brake control signal, based on the traveling condition information, the surrounding environment information, the current position information, the map information and the like. The steering actuator 12 is configured to receive the steering control signal from the vehicle controller 3 and to control the steering device 13 on the basis of the received steering control signal. The brake actuator 14 is configured to receive the brake control signal from the vehicle controller 3 and to control the brake device 15 on the basis of the received brake control signal. The accelerator actuator 16 is configured to receive the accelerator control signal from the vehicle controller 3 and to control the accelerator device 17 on the basis of the received accelerator control signal. In this way, the vehicle controller 3 autonomously controls the traveling of the vehicle 1, based on the traveling condition information, the surrounding environment information, the current position information, the map information and the like. That is, in the autonomous driving mode, the traveling of the vehicle 1 is autonomously controlled by the vehicle system 2.

On the other hand, when the vehicle 1 travels in a manual driving mode, the vehicle controller 3 generates a steering control signal, an accelerator control signal and a brake control signal in conformity with a driver's manual operation on the accelerator pedal, the brake pedal and the steering wheel. In this way, in the manual driving mode, the steering control signal, the accelerator control signal and the brake control signal are generated by the driver's manual operation, so that the traveling of the vehicle 1 is controlled by the driver.

Subsequently, the driving mode of the vehicle 1 is described. The driving mode includes an autonomous driving mode and a manual driving mode. The autonomous driving mode includes a fully autonomous driving mode, an advanced driving support mode, and a driving support mode. In the fully autonomous driving mode, the vehicle system 2 is configured to autonomously perform all of the traveling controls of the steering control, the brake control and the accelerator control, and the driver is not in a state where it is possible to drive the vehicle 1. In the advanced driving support mode, the vehicle system 2 is configured to autonomously perform all of the traveling controls of the steering control, the brake control and the accelerator control, and the driver does not drive the vehicle 1 although the driver is in a state where it is possible to drive the vehicle 1. In the driving support mode, the vehicle system 2 is configured to autonomously perform a part of the traveling controls of the steering control, the brake control and the accelerator control, and the driver drives the vehicle 1 under the driving support of the vehicle system 2. On the other hand, in the manual driving mode, the vehicle system 2 is configured not to autonomously perform the traveling controls, and the driver drives the vehicle 1 without the driving support of the vehicle system 2.

Also, the driving mode of the vehicle 1 may be switched by operating a driving mode changeover switch. In this case, the vehicle controller 3 is configured to switch the driving mode of the vehicle 1 among the four driving modes (the fully autonomous driving mode, the advanced driving support mode, the driving support mode, and the manual driving mode) in accordance with a driver's operation on the driving mode changeover switch. Also, the driving mode of the vehicle 1 may be autonomously switched on the basis of information relating to a travel-allowed section where traveling of an autonomous driving vehicle is allowed or a travel-prohibited section where the traveling of the autonomous driving vehicle is prohibited or information relating to the external weather condition. In this case, the vehicle controller 3 is configured to switch the driving mode of the vehicle 1, based on such information. Also, the driving mode of the vehicle 1 may be autonomously switched by using a seating sensor, a face direction sensor, or the like. In this case, the vehicle controller 3 is configured to switch the driving mode of the vehicle 1, based on an output signal from the seating sensor or the face direction sensor.

Figure 3:
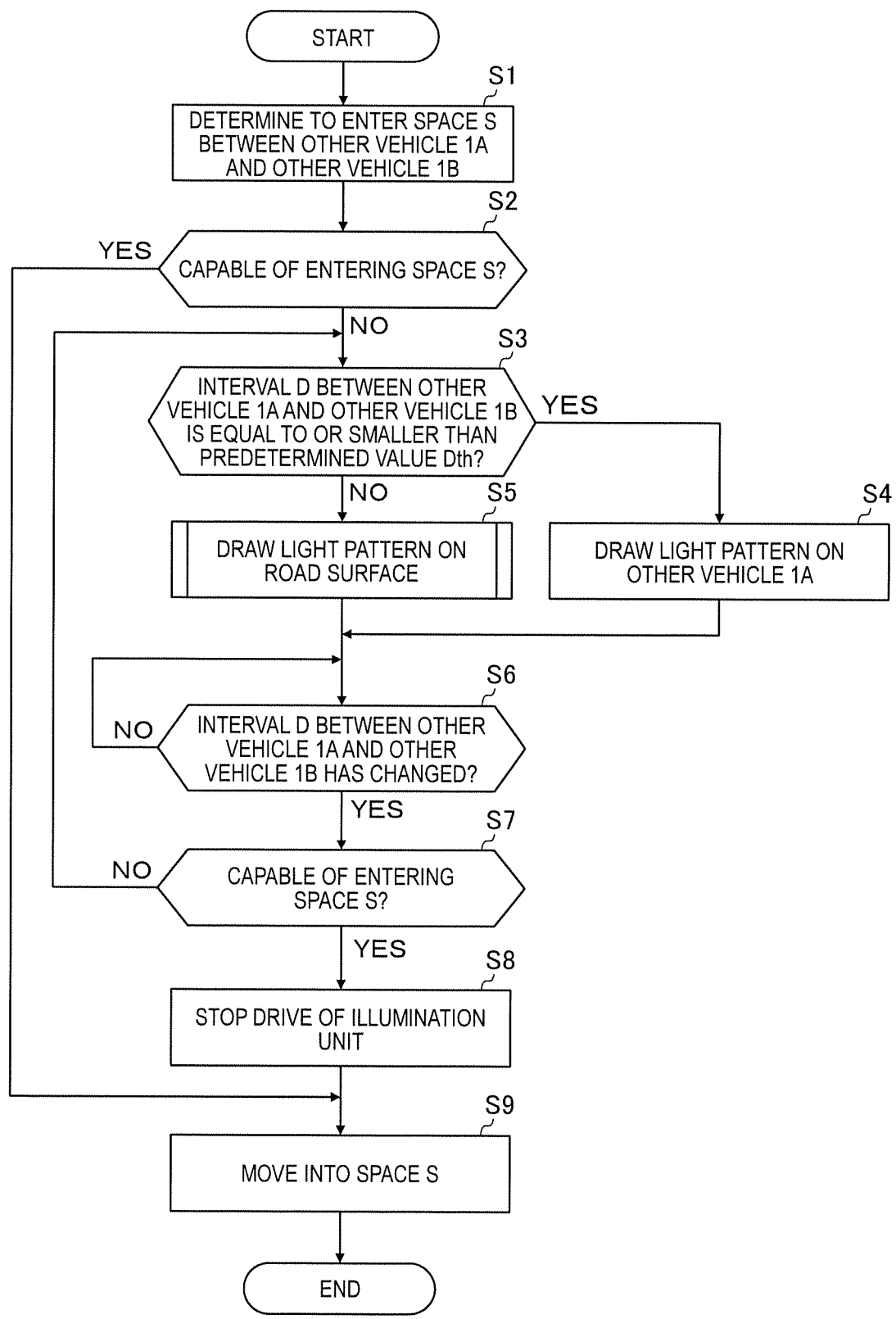
FIG. 3 is a flowchart depicting an example of an operation of the vehicle system of the illustrative embodiment.
Figure 4:
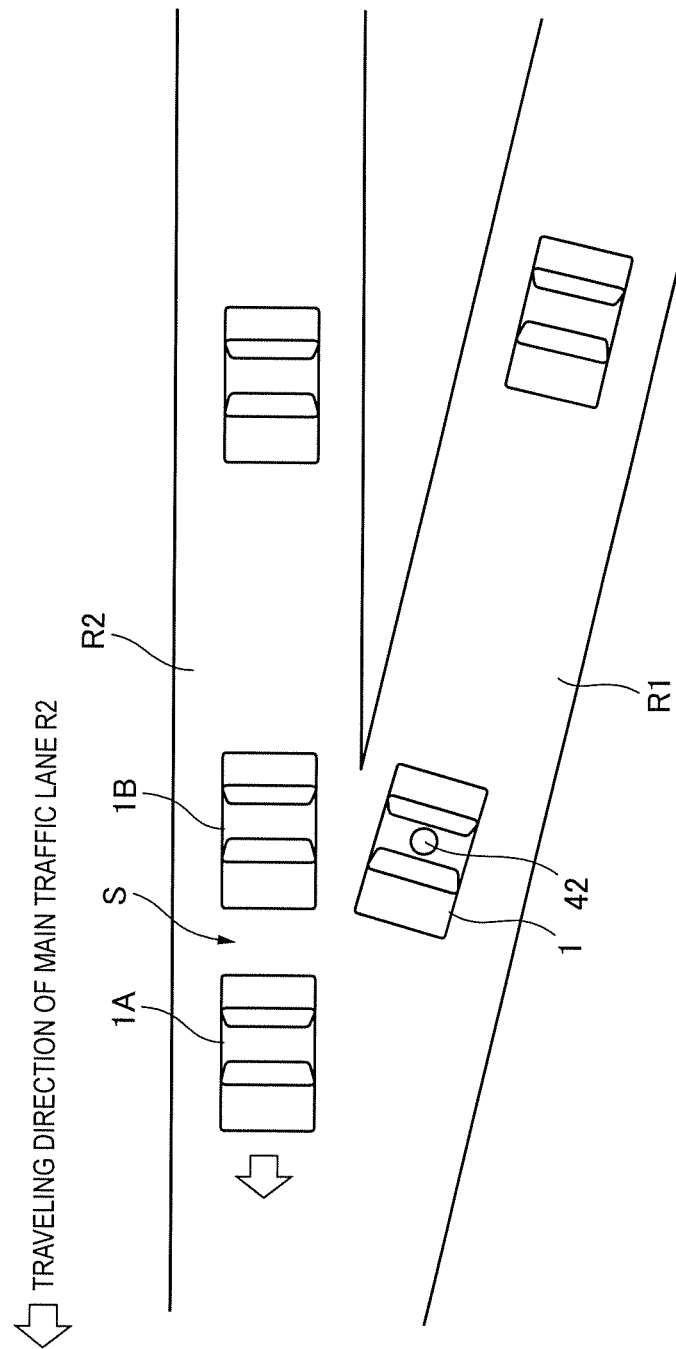
FIG. 4 depicts a vehicle on a merging traffic lane and the other vehicle traveling on a main traffic lane.
Figure 5:
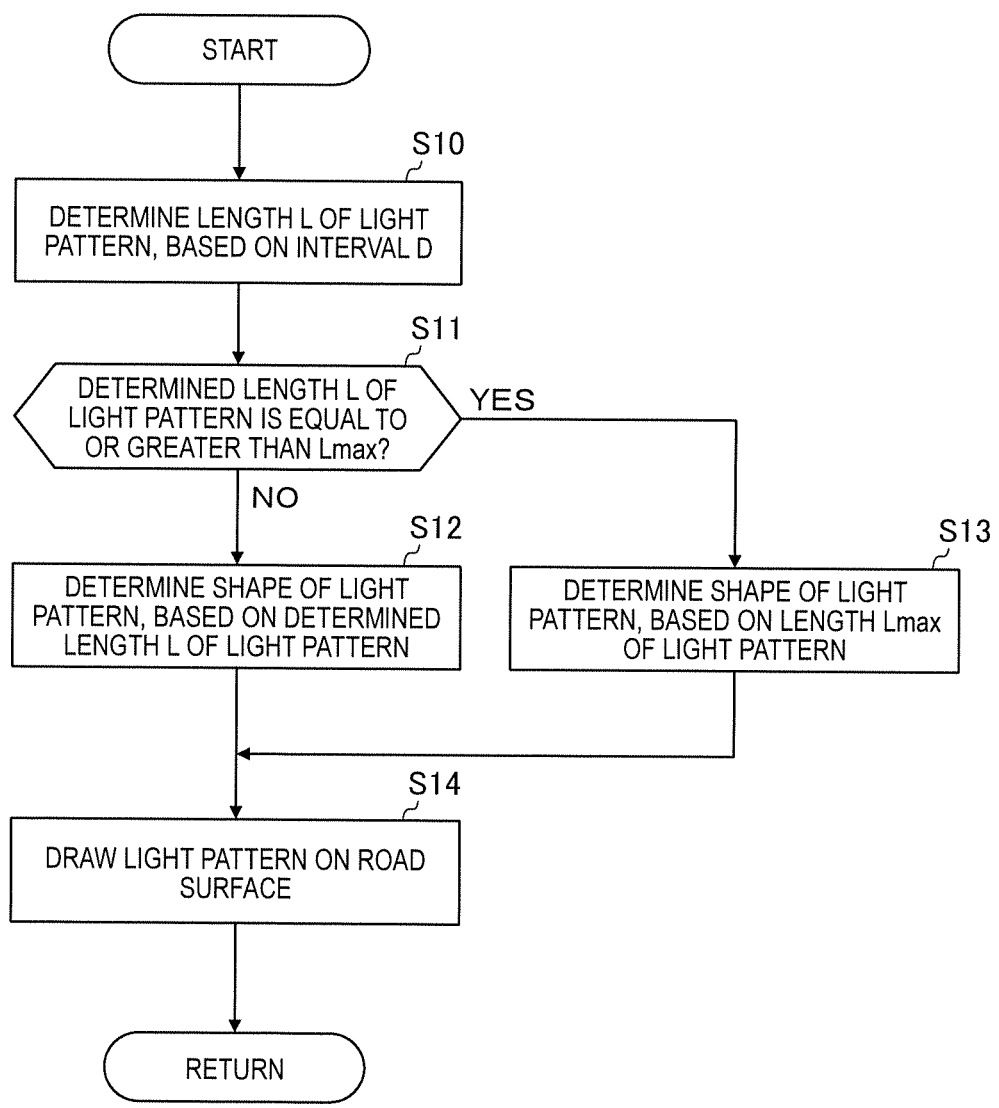
FIG. 5 is a flowchart for illustrating processing of drawing a light pattern on a road surface.
Figure 6:
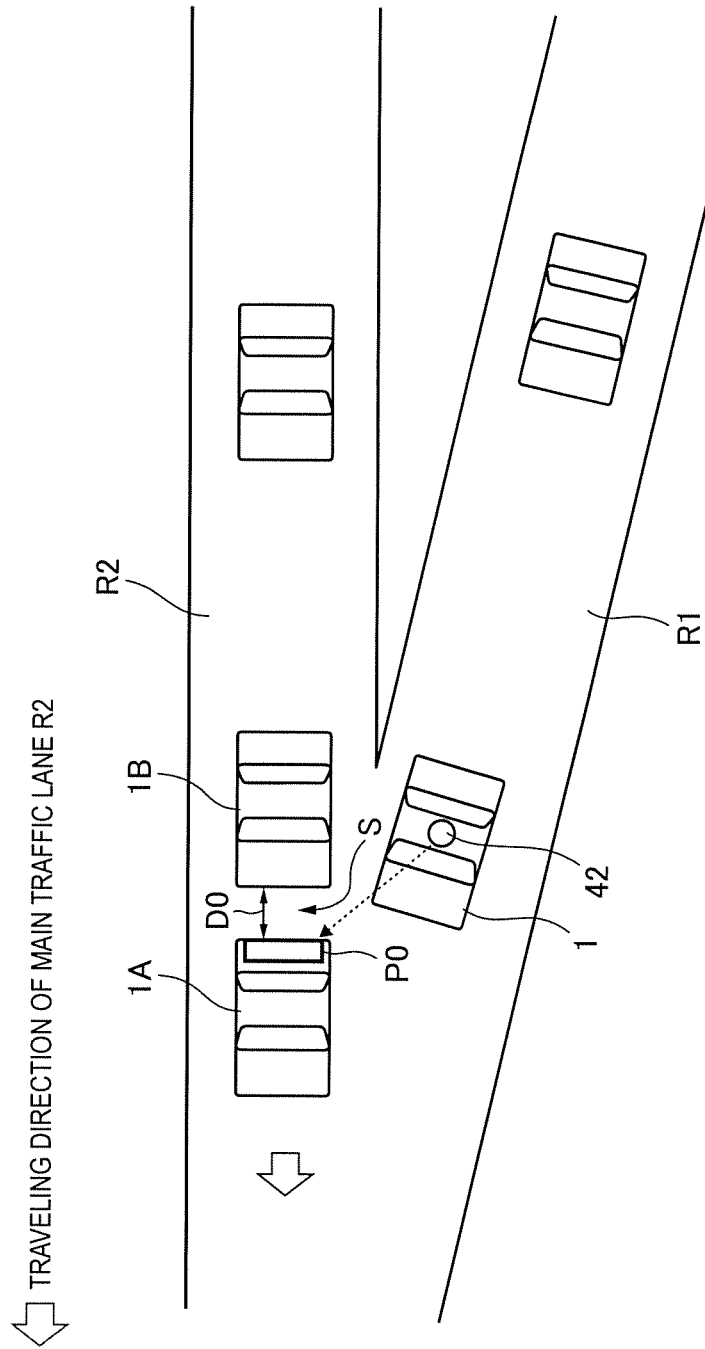
FIG. 6 depicts a light pattern that is drawn on a front other vehicle when an interval D between two other vehicles traveling on the main traffic lane is equal to or smaller than a predetermined value Dth.
Figure 7:
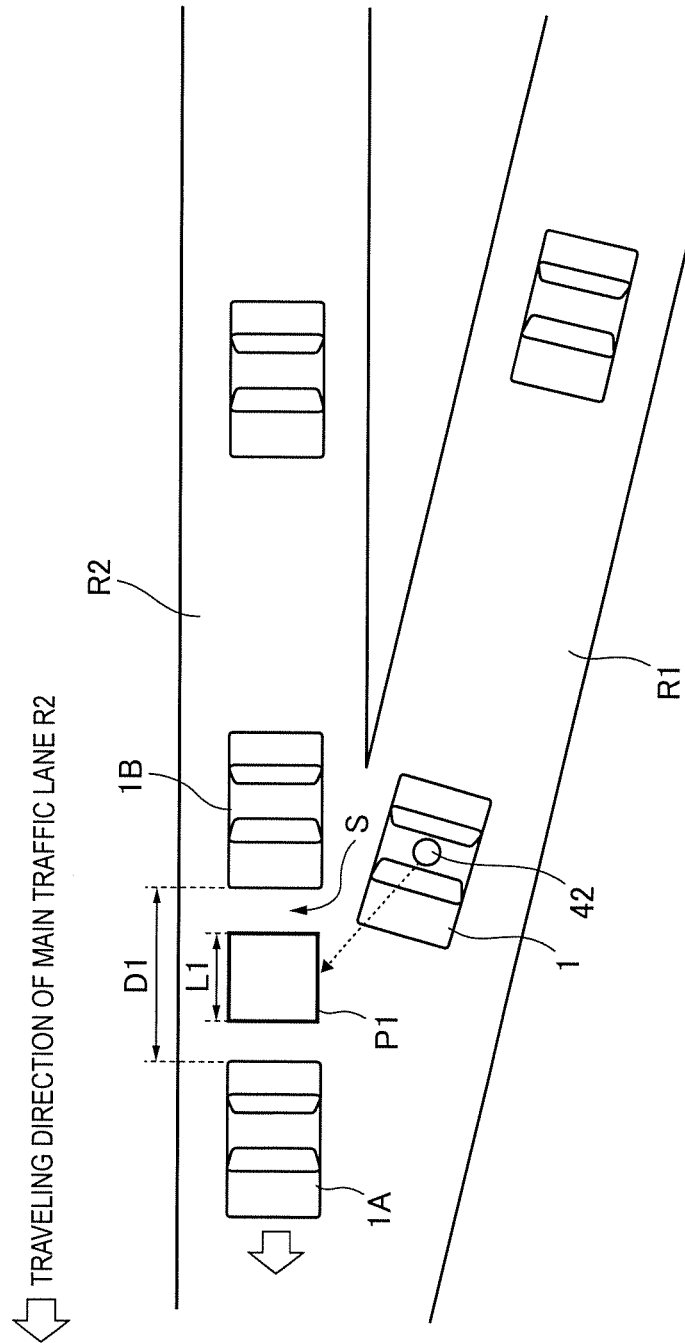
FIG. 7 depicts a light pattern that is drawn on a road surface between the two other vehicles when the interval D between the two other vehicles traveling on the main traffic lane is D1.
Figure 8:
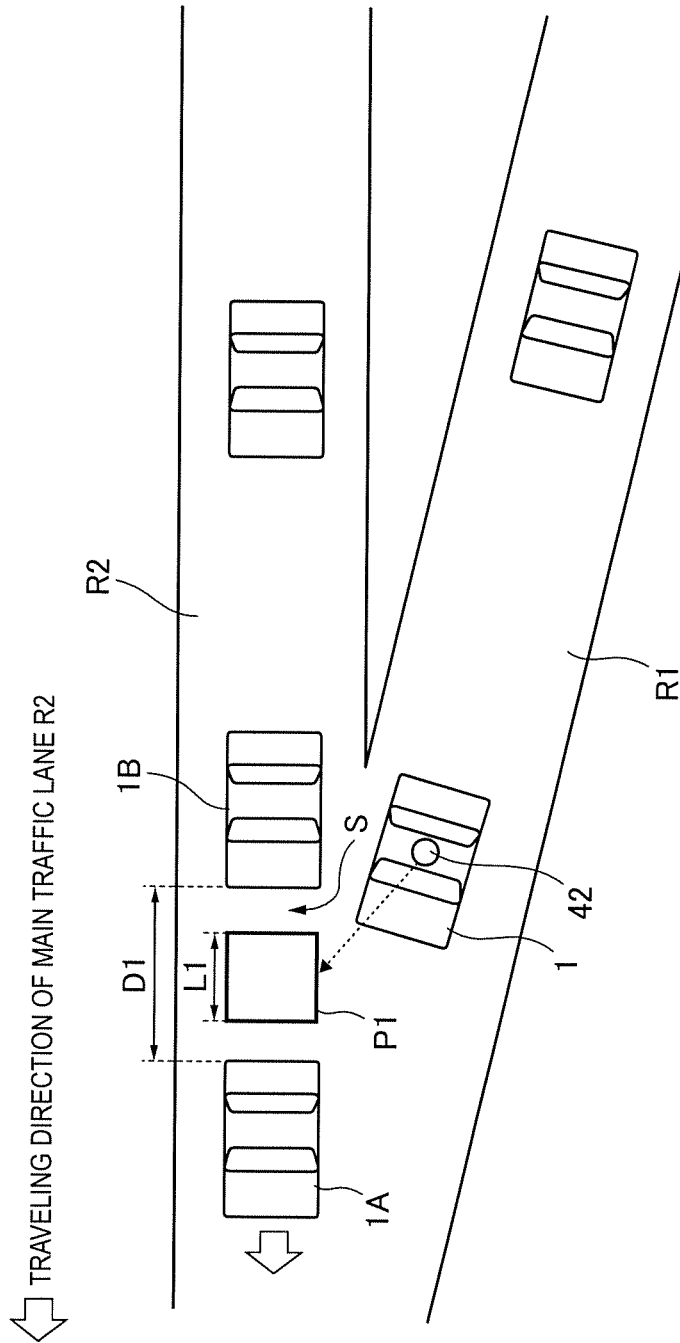
FIG. 8 depicts a light pattern that is drawn on the road surface between the two other vehicles when the interval D between the two other vehicles traveling on the main traffic lane is D2.

Subsequently, an example of an operation of the vehicle system 2 of the illustrative embodiment is described with reference to FIGS. 3 to 8. FIG. 3 is a flowchart depicting an example of an operation of the vehicle system of the illustrative embodiment. FIG. 4 depicts the vehicle 1 on a merging traffic lane R1 (an example of the first traffic lane) and other vehicle 1A (an example of the first other vehicle) and other vehicle 1B (an example of the second other vehicle), which is a following vehicle of the other vehicle 1A, traveling on a main traffic lane R2 (an example of the second traffic lane). FIG. 5 is a flowchart for illustrating processing of drawing a light pattern on a road surface. FIG. 6 depicts a light pattern PO that is drawn on the other vehicle 1A when an interval D between the other vehicles 1A, 1B traveling on the main traffic lane R2 is equal to or smaller than a predetermined value Dth. FIG. 7 depicts a light pattern P1 that is drawn on the road surface between the other vehicles 1A, 1B when the interval D between the other vehicles 1A, 1B traveling on the main traffic lane R2 is D1. FIG. 8 depicts a light pattern P2 that is drawn on the road surface between the other vehicles 1A, 1B when the interval D between the other vehicles 1A, 1B traveling on the main traffic lane R2 is D2.

In the meantime, in the descriptions, it is assumed that the vehicle 1 is traveling in the advanced driving support mode or the fully autonomous driving mode. However, the driving mode of the vehicle 1 may be the driving support mode or the manual driving mode.

As shown in FIGS. 3 and 4, when the vehicle 1 reaches a merging point between the merging traffic lane R1 and the main traffic lane R2, the vehicle controller 3 detects a plurality of other vehicles traveling on the main traffic lane R2, based on the detection data indicative of the surrounding environment of the vehicle 1 and acquired by the camera 6 and/or the radar 7. Then, the vehicle controller 3 determines to enter a space S between the other vehicles 1A, 1B so as to change the traffic lane of the vehicle 1 from the merging traffic lane R1 to the main traffic lane R2 (step S1). Here, the detection data indicative of the surrounding environment of the vehicle 1 may be detection data indicative of the surrounding environment over the entire surrounding (360°) of the vehicle 1. In this case, at least one camera 6 and/or radar 7 may be arranged at four corners of the vehicle 1.

Then, in step S2, the vehicle controller 3 determines whether the vehicle 1 can enter the space S between the other vehicles 1A, 1B, based on the detection data indicative of the surrounding environment of the vehicle 1 and acquired by the camera 6 and/or the radar 7. For example, the vehicle controller 3 specifies the interval D between the other vehicles 1A, 1B on the basis of the detection data indicative of the surrounding environment of the vehicle 1 and then determines whether the specified interval D is sufficiently larger than an entire length of the vehicle 1. Then, when it is determined that the interval D is sufficiently larger than the entire length of the vehicle 1 and a signal, which indicates that the other vehicle 1B is to give way to the vehicle 1, is received from the other vehicle 1B, the vehicle controller 3 may determine that the vehicle 1 can enter the space S. When a determination result in step S2 is YES, the vehicle controller 3 controls the steering actuator 12 and the accelerator actuator 16 to move the vehicle 1 into the space S between the other vehicles 1A, 1B (step S9). On the other hand, when the determination result in step S2 is NO, the processing proceeds to step S3.

Then, in step S3, the vehicle controller 3 determines whether the interval D between the other vehicles 1A, 1B is equal to or smaller than a predetermined value Dth. Here, the interval D between the other vehicles 1A, 1B may be defined as an interval between a rear end of the other vehicle 1A and a front end of the other vehicle 1B in a traveling direction of the main traffic lane R2. Also, the predetermined value Dth may be appropriately changed, depending on the surrounding environment of the vehicle 1. The information about the predetermined value Dth is saved in the memory of the vehicle controller 3 or in the storage device 11, for example.

When the vehicle controller 3 determines that the interval D between the other vehicles 1A, 1B is equal to or smaller than the predetermined value Dth (YES in step S3), the illumination unit 42 draws a light pattern P0 on the other vehicle 1A (step S4), as shown in FIG. 6. Specifically, when the vehicle controller 3 determines that the interval D between the other vehicles 1A, 1B is D0 (<the predetermined value Dth), the vehicle controller 3 generates an instruction signal for instructing the light pattern P0 to be drawn on the other vehicle 1A, and transmits the instruction signal and the position information of the other vehicle 1A to the illumination controller 43. Then, the illumination controller 43 controls the illumination unit 42 to draw the light pattern PO on the other vehicle 1A, based on the instruction signal and the position information of the other vehicle 1A received from the vehicle controller 3. As shown in FIG. 6, a box-shaped light pattern PO may be irradiated to a rear part of the other vehicle 1A. When the interval D between the other vehicles 1A, 1B is equal to or smaller than the predetermined value Dth, a length of the light pattern PO in the traveling direction of the main traffic lane R2 may be constant. In the meantime, in the example of FIG. 6, the light pattern PO is entirely drawn on the rear part of the vehicle body of the other vehicle 1A. However, a part of the light pattern PO may be drawn on a road surface between the other vehicles 1A, 1B.

On the other hand, when the vehicle controller 3 determines that the interval D between the other vehicles 1A, 1B is greater than the predetermined value Dth (NO in step S3), the illumination unit 42 draws the light pattern on the road surface between the other vehicles 1A, 1B (step S5). The processing of step S5 is described in detail with reference to FIG. 5. As shown in FIG. 5, the vehicle controller 3 determines a length L of the box-shaped light pattern in the traveling direction of the main traffic lane R2, based on the interval D between the other vehicles 1A, 1B (step S10). Here, the length L of the light pattern may be linearly or stepwise changed, depending on the interval D between the other vehicles 1A, 1B. In particular, in the illustrative embodiment, the vehicle controller 3 determines the length L of the light pattern so that the length L of the light pattern is to increase depending on an increase in the interval D between the other vehicles 1A, 1B. Also, the vehicle controller 3 may determine the length L of the light pattern corresponding to the interval D by referring to a relation equation or look-up table (LUT) indicative of a relation between the length L of the light pattern and the interval D. Also, in the illustrative embodiment, the length L of the light pattern is set to be smaller than the interval D between the other vehicles 1A, 1B so that the light pattern is not to be irradiated to both the other vehicles 1A, 1B.

Then, in step S11, the vehicle controller 3 determines whether the determined length L of the light pattern is equal to or greater than Lmax. When it is determined that the determined length L of the light pattern is smaller than Lmax (NO in step S11), the vehicle controller 3 determines a shape of the light pattern, based on the determined length L of the light pattern (step S12). On the other hand, when it is determined that the determined length L of the light pattern is equal to or greater than Lmax (YES in step S11), the vehicle controller 3 determines a shape of the light pattern, based on the length Lmax of the light pattern (step S13). Here, the length Lmax of the light pattern is a maximum value of the length L of the light pattern and is determined depending on the entire length of the vehicle 1. That is, the length Lmax of the light pattern is a value associated with the entire length of the vehicle 1. For example, the length Lmax of the light pattern may be the same as the entire length of the vehicle 1. The information about the length Lmax of the light pattern is saved in the memory of the vehicle controller 3 or in the storage device 11, for example.

Then, in step S14, the illumination unit 42 draws the determined light pattern on the road surface between the other vehicles 1A, 1B (step S14). Specifically, the vehicle controller 3 generates an instruction signal for instructing the determined light pattern to be drawn on the road surface between the other vehicles 1A, 1B and transmits the instruction signal and the position information of the space S between the other vehicles 1A, 1B to the illumination controller 43. Then, the illumination controller 43 controls the illumination unit 42 to draw the light pattern on the road surface between the other vehicles 1A, 1B, based on the instruction signal and the position information of the space S received from the vehicle controller 3.

For example, as shown in FIG. 7, when the interval D between the other vehicles 1A, 1B is D1, the vehicle controller 3 determines the length L of the light pattern in the traveling direction of the main traffic lane R2, as L1 (<Lmax), based on the interval D1. Then, the vehicle controller 3 determines that the length L1 of the light pattern is smaller than Lmax, and determines the light pattern to be drawn on the road surface, as a light pattern P1, based on the determined length L1. Then, the vehicle controller 3 generates an instruction signal for instructing the light pattern P1 to be drawn on the road surface between the other vehicles 1A, 1B and transmits the instruction signal and the position information of the space S between the other vehicles 1A, 1B to the illumination controller 43. Then, the illumination controller 43 controls the illumination unit 42 to draw the light pattern P1 on the road surface between the other vehicles 1A, 1B, based on the instruction signal and the position information of the space S received from the vehicle controller 3. As shown in FIG. 7, the length L1 of the light pattern P1 is set to be smaller than the interval D1 between the other vehicles 1A, 1B. In particular, a predetermined margin is provided between the rear end of the other vehicle 1A and a front end of the light pattern P1 and a predetermined margin is provided between the front end of the other vehicle 1B and a rear end of the light pattern P1 so that the light pattern P1 is not to be irradiated to both the other vehicles 1A, 1B. In this way, it is possible to favorably prevent the glare light from being irradiated to passengers in the other vehicles 1A, 1B.

Also, as shown in FIG. 8, when the interval D between the other vehicles 1A, 1B is D2 (>D1), the vehicle controller 3 determines the length L of the light pattern in the traveling direction of the main traffic lane R2, as L2 (<Lmax), based on the interval D2. In the illustrative embodiment, the length L of the light pattern is increased, depending on the increase in the interval D. Therefore, from the relation of the interval D2>D1, the length L2 is greater than the length L1. Then, the vehicle controller 3 determines that the length L2 of the light pattern2 is smaller than Lmax, and determines the light pattern to be drawn on the road surface on the basis of the length L2, as a light pattern P2. Then, the vehicle controller 3 generates an instruction signal for instructing the light pattern P2 to be drawn on the road surface between the other vehicles 1A, 1B and transmits the instruction signal and the position information of the space S between the other vehicles 1A, 1B to the illumination controller 43. The illumination controller 43 controls the illumination unit 42 to draw the light pattern P2 on the road surface between the other vehicles 1A, 1B, based on the instruction signal and the position information of the space S received from the vehicle controller 3. Also in the example of FIG. 8, the length L2 of the light pattern P2 is set to be smaller than the interval D2 between the other vehicles 1A, 1B. In particular, a predetermined margin is provided between the rear end of the other vehicle 1A and a front end of the light pattern P2 and a predetermined margin is provided between the front end of the other vehicle 1B and a rear end of the light pattern P2. In this way, it is possible to favorably prevent the glare light from being irradiated to the passengers in the other vehicles 1A, 1B.

Returning to FIG. 3, in step S6, the vehicle controller 3 determines whether the interval D between the other vehicles 1A, 1B has changed, based on the detection data indicative of the surrounding environment of the vehicle 1 and acquired by the camera 6 and/or the radar 7. When a determination result in step S6 is YES, the processing proceeds to step S7. On the other hand, when the determination result in step S6 is NO, the determination processing of step S6 is again executed. Then, in step S7, the vehicle controller 3 determines whether the vehicle 1 can enter the space S between the other vehicles 1A, 1B, based on at least the detection data acquired by the camera 6 and/or the radar 7. When a determination result in step S7 is YES, the vehicle controller 3 generates an instruction signal for instructing stop of the drive of the illumination unit 42 and transmits the instruction signal to the illumination controller 43. Thereafter, the illumination controller 43 stops the drive of the illumination unit 42, depending on the received instruction signal (step S8). Then, the vehicle controller 3 controls the steering actuator 12 and the accelerator actuator 16 to move the vehicle 1 into the space S between the other vehicles 1A, 1B (step S9).

On the other hand, when the determination result in step S7 is NO, the processing of steps S3 to S6 is again executed. In this way, the light pattern is drawn on the road surface between the other vehicles 1A, 1B depending on the interval D between the other vehicles 1A, 1B, until the vehicle 1 can enter the space S between the other vehicles 1A, 1B.

According to the illustrative embodiment, when the vehicle 1 changes the traffic lane from the merging traffic lane R1 to the main traffic lane R2, the illumination controller 43 controls the illumination unit 42 to irradiate the light pattern on the road surface between the other vehicles 1A, 1B and to change the length L of the light pattern, depending on the interval D between the other vehicles 1A, 1B. In this way, the passenger in the other vehicle 1B can clearly perceive an the intention of the vehicle 1 (i.e., an intention of the vehicle 1 to enter the space S between the other vehicles 1A, 1B) by visually recognizing the aspect that the length L of the light pattern is changed, depending on the interval D between the other vehicles 1A, 1B. Therefore, it is possible to provide the illumination system 4 and the vehicle 1 capable of implementing rich visual communication between the vehicles when changing the traffic lane from the merging traffic lane R1 to the main traffic lane R2 (in other words, at the merging point).

Also, according to the illustrative embodiment, the illumination controller 43 increases the length L of the light pattern, depending on the increase in the interval D between the other vehicles 1A, 1B. Specifically, as shown in FIGS. 7 and 8, when the interval D2 is greater than the interval D1, the length L2 of the light pattern P2 is greater than the length L1 of the light pattern P1. For this reason, the passenger in the other vehicle 1B can clearly perceive the the intention of the vehicle 1 (i.e., the intention of the vehicle 1 to enter the space S between the other vehicles 1A, 1B) by visually recognizing the aspect that the length L of the light pattern is increased, depending on the increase in the interval D between the other vehicles 1A, 1B. Therefore, it is possible to provide the illumination system 4 and the vehicle 1 capable of implementing rich visual communication between the vehicles when changing the traffic lane from the merging traffic lane R1 to the main traffic lane R2.

Also, according to the illustrative embodiment, when the interval D is greater than the predetermined value Dth, the illumination controller 43 controls the illumination unit 42 to irradiate the light pattern P1; P2 on the road surface between the other vehicles 1A, 1B (refer to FIGS. 7 and 8). On the other hand, when the interval D is equal to or smaller than the predetermined value Dth, the illumination controller 43 controls the illumination unit 42 to irradiate the light pattern PO on the other vehicle 1A. In this respect, when the interval D between the other vehicles 1A, 1B is narrow (the interval D is equal to or smaller than the predetermined value Dth), it is difficult for the passenger in the other vehicle 1B, which is a following vehicle, to perceive the light pattern to be irradiated on the road surface between the other vehicles 1A, 1B. In the meantime, in the illustrative embodiment, the light pattern PO is irradiated on the other vehicle 1A in such a situation. For this reason, even when the interval D is narrow, the passenger in the other vehicle 1B can clearly perceive the intention of the vehicle 1 (i.e., the intention of the vehicle 1 to enter the space S between the other vehicles 1A, 1B) by visually recognizing the light pattern PO irradiated on the other vehicle 1A.

Also, according to the illustrative embodiment, the maximum value of the length L of the light pattern to be irradiated on the road surface is set as Lmax. The maximum value Lmax is a value associated with the entire length of the vehicle 1. In this way, the passenger in the other vehicle 1B can clearly perceive the intention of the vehicle 1 to enter the space S between the other vehicles 1A, 1B by visually recognizing the light pattern having the length Lmax associated with the entire length of the vehicle 1.

Also, according to the illustrative embodiment, the light pattern is irradiated on the road surface between the other vehicles 1A, 1B, and the length L of the light pattern in the traveling direction of the main traffic lane R2 is changed, depending on the interval D between the other vehicles 1A, 1B. In this way, the passenger in the other vehicle 1B can visually recognize more clearly the aspect that the length of the light pattern is changed depending on the interval D.

In the meantime, in the illustrative embodiment, the box-shaped light pattern has been described as an example of the shape of the light pattern to be emitted from the illumination unit 42 of the vehicle 1. However, the shape of the light pattern of the illustrative embodiment is not limited to the box-shaped light pattern. For example, a linear light pattern or a circular light pattern may be emitted from the illumination unit 42. Also, only an outer shape line of the light pattern may be drawn by the laser light, or an inner region of the light pattern defined by the outer shape line may also be drawn by the laser light, in addition to the outer shape line of the light pattern.

Also, in the illustrative embodiment, the length L of the light pattern is changed, depending on the interval D between the other vehicles 1A, 1B. However, the illumination feature of the light pattern may be changed together with the length L of the light pattern, depending on the interval D between the other vehicles 1A, 1B. For example, an illumination color or a blinking aspect (in particular, a blinking cycle) of the light pattern may be changed, depending on the interval D between the other vehicles 1A, 1B. In this case, the passenger in the other vehicle 1B can more clearly perceive the intention of the vehicle 1 to enter the space S between the other vehicles 1A, 1B by visually recognizing the aspect the length L and the illumination feature of the light pattern are changed, depending on the interval D. Also, in the illustrative embodiment, the illumination controller 43 may change the illumination feature (for example, an illumination color or a blinking aspect) of the light pattern emitted from the illumination unit 42 before stopping the drive of the illumination unit 42 in step S8. In this case, the passenger in the other vehicle 1B can perceive a timing at which the vehicle 1 is to enter the space S by visually recognizing the change in the illumination feature of the light pattern L.

Also, in the illustrative embodiment, the processing of step S3 (refer to FIG. 3) and the processing of steps S10 to S13 (refer to FIG. 5) are executed by the vehicle controller 3. However, the processing may be executed by the illumination controller 43. In this case, the illumination controller 43 executes the determination processing of step S3 after receiving the information indicative of the interval D between the other vehicles 1A, 1B from the vehicle controller 3. In this case, the information about the predetermined value Dth may be saved in the memory of the illumination controller 43. Also, the illumination controller 43 may execute the processing of steps S10 to S13 and receive the position information of the space S between the other vehicles 1A, 1B from the vehicle controller 3.

Figure 9:
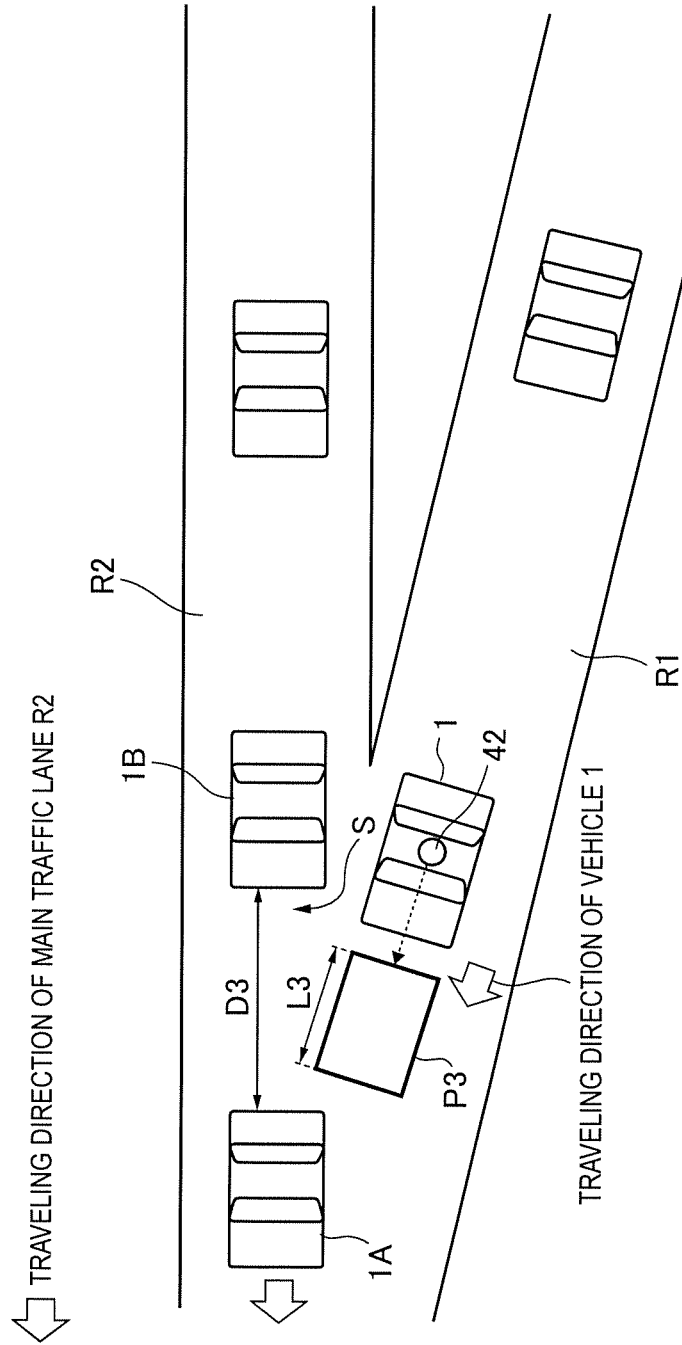
FIG. 9 depicts a light pattern emitted from the vehicle.
Figure 10:
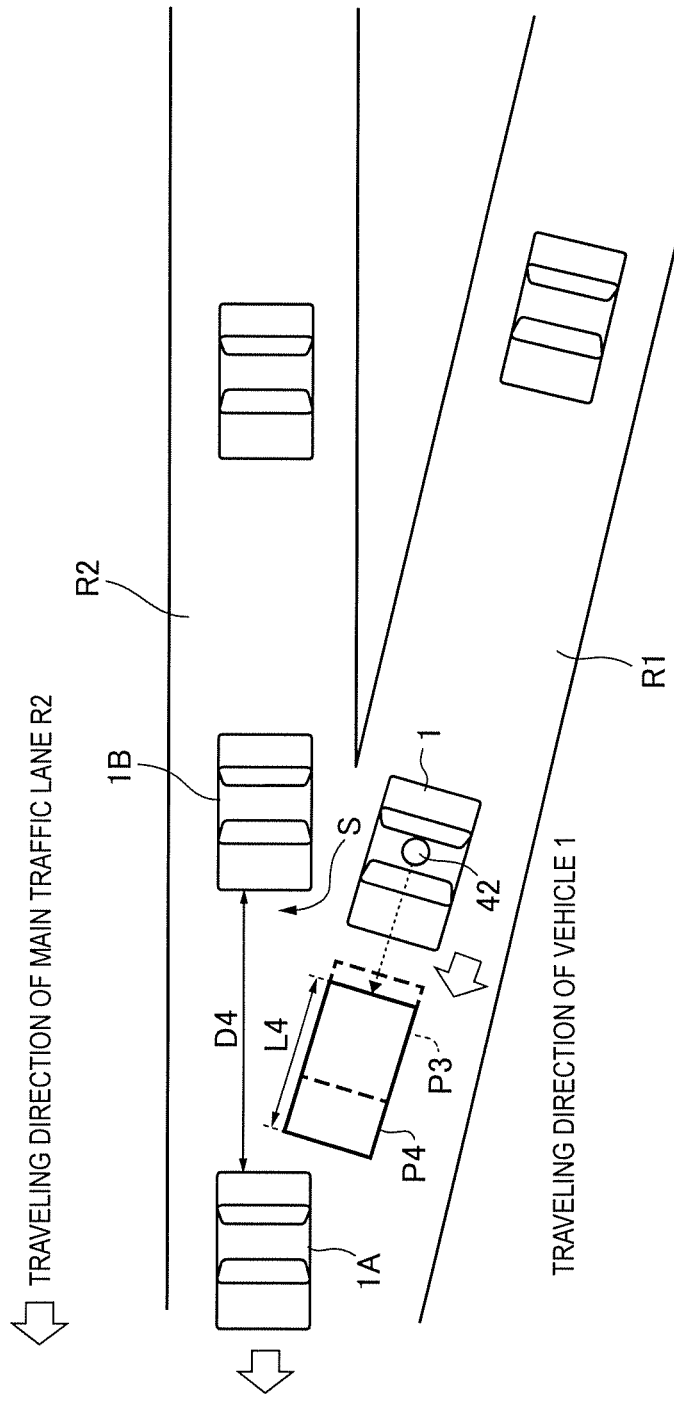
FIG. 10 illustrates an aspect that a length of the light pattern in a traveling direction of the vehicle is changed, depending on the interval D between the two other vehicles traveling on the main traffic lane.

Subsequently, a modified embodiment of the light pattern to be emitted from the vehicle 1 is described with reference to FIGS. 9 and 10. FIG. 9 depicts a light pattern P3 emitted from the vehicle 1. FIG. 10 illustrates an aspect that the length L of the light pattern in the traveling direction of the vehicle 1 is changed, depending on the interval D between the two other vehicles traveling on the main traffic lane R2. In the light pattern of the modified embodiment, a longitudinal direction of the light pattern coincides with the traveling direction of the main traffic lane R2 and the length L of the light pattern in the traveling direction of the main traffic lane R2 is changed, depending on the interval D. Also, the light pattern is entirely irradiated on the road surface between the other vehicles 1A, 1B. In the meantime, in the light pattern of the modified embodiment, the longitudinal direction of the light pattern coincides with the traveling direction of the vehicle 1 and the length L of the light pattern in the traveling direction of the vehicle 1 is changed, depending on the interval D. Also, a part of the light pattern is irradiated on the road surface between the other vehicles 1A, 1B. In this respect, the light pattern of the modified embodiment is different from the light pattern of the illustrative embodiment.

As shown in FIG. 9, when the interval D between the other vehicles 1A, 1B is D3, the vehicle controller 3 determines a length L3 of the light pattern (<Lmax), depending on the interval D3, and then determines a light pattern to be drawn on the road surface on the basis of the length L3, as a light pattern P3. Thereafter, the illumination controller 43 controls the illumination unit 42 to draw the light pattern P3 on the road surface, based on the instruction signal and the position information of the space S received from the vehicle controller 3. According to the light pattern P3 shown in FIG. 9, the longitudinal direction of the light pattern P3 coincides with the traveling direction of the vehicle 1 and the length L3 of the light pattern P3 in the traveling direction of the vehicle 1 is determined, depending on the interval D3. Also, the illumination controller 43 determines a drawing position of the light pattern P3 so that a part of the light pattern P3 is to be irradiated on the road surface between the other vehicles 1A, 1B.

Also, as shown in FIG. 10, when the interval D between the other vehicles 1A, 1B is D4 (>D3), the vehicle controller 3 determines a length L4 of the light pattern (<Lmax) depending on the interval D, and then determines a light pattern to be drawn on the road surface on the basis of the length L4, as a light pattern P4. Thereafter, the illumination controller 43 controls the illumination unit 42 to draw the light pattern P4 on the road surface, based on the instruction signal and the position information of the space S received from the vehicle controller 3. According to the light pattern P4 shown in FIG. 10, the longitudinal direction of the light pattern P4 coincides with the traveling direction of the vehicle 1 and the length L4 of the light pattern P4 in the traveling direction of the vehicle 1 is determined, depending on the interval D4. Here, the length L4 is greater than the length L3, from the relation of the interval D4>D3. Also, the illumination controller 43 determines a drawing position of the light pattern P4 so that a part of the light pattern P4 is to be irradiated on the road surface between the other vehicles 1A, 1B.

According to the modified embodiment, in a state where a part of the light pattern is irradiated on the road surface between the other vehicles 1A, 1B, the length L of the light pattern in the traveling direction of the vehicle 1 is changed, depending on the interval D between the other vehicles 1A, 1B. In particular, the length L of the light pattern in the traveling direction of the vehicle 1 is increased, depending on the increase in the interval D. In this way, the passenger in the other vehicle 1B can clearly perceive the intention of the vehicle 1 to enter the space S between the other vehicles 1A, 1B by visually recognizing the aspect that the length L of the light pattern in the traveling direction of the vehicle 1 is changed, depending on the interval D, in the state where a part of the light pattern is irradiated on the road surface between the other vehicles 1A, 1B.

Although the illustrative embodiments of the present disclosure have been described, it goes without saying that the technical scope of the present disclosure should not be interpreted limitedly by the descriptions of the illustrative embodiments. It will be understood by one skilled in the art that the illustrative embodiments are just exemplary and that the illustrative embodiments can be diversely changed within the scope of the invention defined in the claims. The technical scope of the present disclosure should be determined on the basis of the scope of the invention defined in the claims and its equivalent scope.

In the illustrative embodiments, the driving mode of the vehicle includes the fully autonomous driving mode, the advanced driving support mode, the driving support mode, and the manual driving mode. However, the driving mode of the vehicle should not be limited to the four modes. The classification of the driving mode of the vehicle may be appropriately changed, in accordance with laws or rules relating to the autonomous driving in each country. Likewise, the definitions of "the fully autonomous driving mode", "the advanced driving support mode" and "the driving support mode" described in the illustrative embodiments are just examples, and may be appropriately changed, in accordance with laws or rules relating to the autonomous driving in each country.

Figure 11:
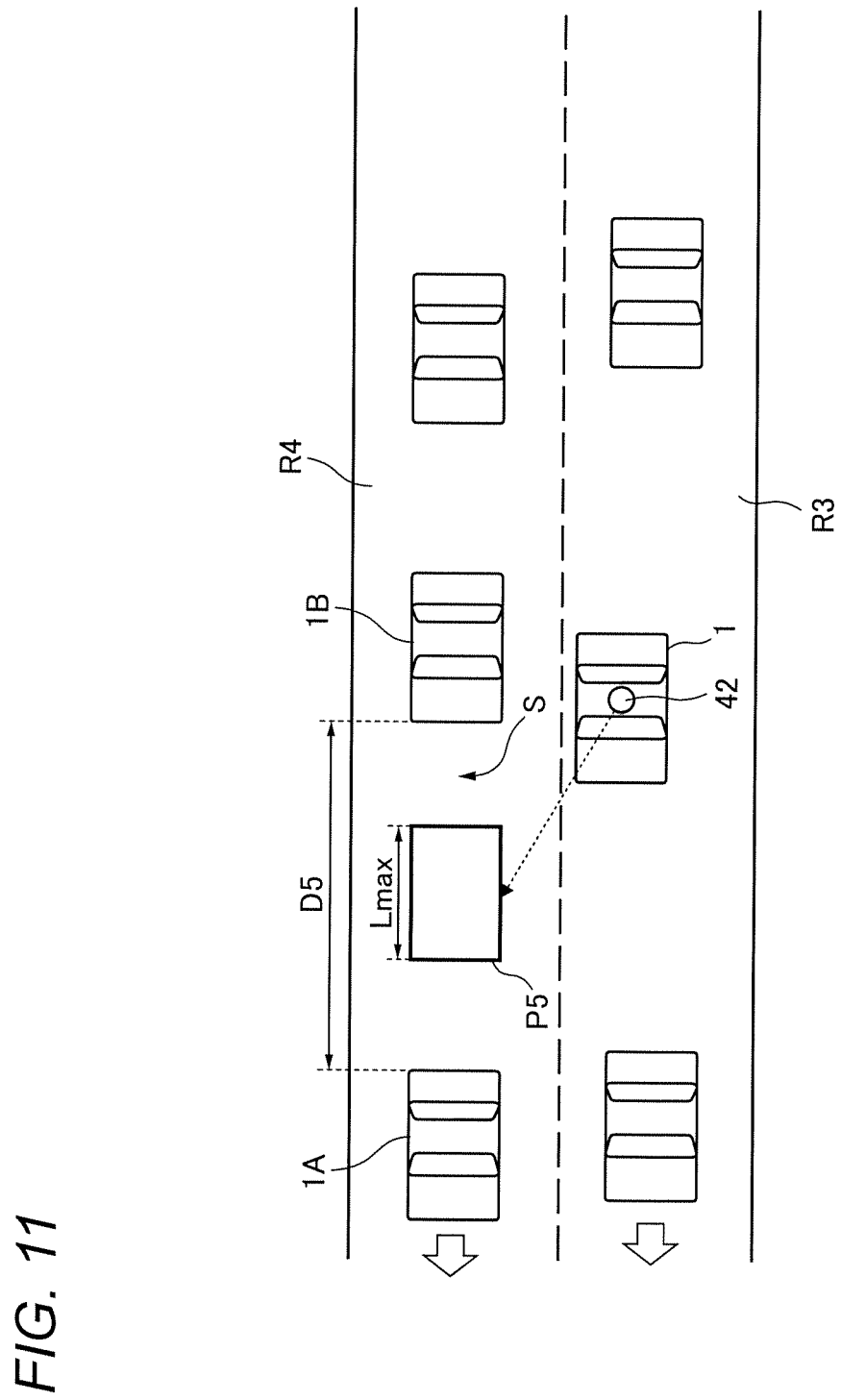
FIG. 11 depicts a vehicle traveling on a traveling traffic lane and other vehicle traveling on a passing traffic lane.

Also, in the illustrative embodiment, when the vehicle 1 changes the traffic lane from the merging traffic lane to the main traffic lane, the illumination controller 43 changes the length L of the light pattern, depending on the interval D between the other vehicles 1A, 1B. However, the traffic lane change of the illustrative embodiment is not limited thereto. For example, when the vehicle 1 changes the traffic lane from a traveling traffic lane to a passing traffic lane or when the vehicle 1 changes the traffic lane from the passing traffic lane to the traveling traffic lane, the illumination controller 43 may change the length L of the light pattern, depending on the interval D between the other vehicles 1A, 1B. For example, as shown in FIG. 11, when the vehicle 1 traveling on a traveling traffic lane R3 changes the traffic lane from the traveling traffic lane R3 to a passing traffic lane R4, the illumination controller 43 may change the length L of the light pattern, depending on the interval D between the other vehicles 1A, 1B traveling on the passing traffic lane R4. In this example, when the interval D between the other vehicles 1A, 1B is D5, the vehicle controller 3 determines a length L5 of the light pattern (>Lmax), depending on the interval D5, and then determines a light pattern to be drawn on the road surface on the basis of the length Lmax, as a light pattern P5. Thereafter, the illumination controller 43 controls the illumination unit 42 to draw the light pattern P5 on the road surface between the other vehicles 1A, 1B, based on the instruction signal and the position information of the space S received from the vehicle controller 3. The passenger in the other vehicle 1B traveling on the passing traffic lane R4 can clearly perceive the intention of the vehicle 1 to enter the space S between the other vehicles 1A, 1B by visually recognizing the aspect that the length L of the light pattern is changed, depending on the interval D. In this way, it is possible to provide rich visual communication between the vehicles upon the change of the traffic lanes.

The embodiments are summarized as follows.

A vehicle illumination system related to one aspect of the present disclosure and provided to a vehicle capable of traveling in an autonomous driving mode includes: an illumination unit configured to emit a light pattern toward an outside of the vehicle, and an illumination controller configured to control the illumination unit to irradiate the light pattern to a predetermined position. When the vehicle changes a traffic lane from a first traffic lane to a second traffic lane, the illumination controller: controls the illumination unit to irradiate the light pattern on a road surface between a first other vehicle traveling on the second traffic lane and a second other vehicle which is a following vehicle of the first other vehicle, and changes a length of the light pattern, depending on an interval between the first other vehicle and the second other vehicle.

According to the above configuration, the length of the light pattern to be irradiated on the road surface between the first other vehicle and the second other vehicle is changed, depending on the interval between the first other vehicle and the second other vehicle traveling on the second traffic lane. In this way, a passenger in the second other vehicle can clearly perceive an intention of the vehicle (i.e., an intention of the vehicle to enter the space between the first other vehicle and the second other vehicle) by visually recognizing the aspect that the length of the light pattern is changed depending on the interval between the two other vehicles. Therefore, it is possible to provide the vehicle illumination system capable of implementing rich visual communication between the vehicles upon the change of the traffic lanes.

Moreover, when the vehicle changes the traffic lane from the first traffic lane to the second traffic lane, the illumination controller may increase the length of the light pattern, depending on an increase in the interval.

According to the above configuration, the length of the light pattern irradiated on the road surface between the first other vehicle and the second other vehicle is increased, depending on the increase in the interval between the first other vehicle and the second other vehicle traveling on the second traffic lane. In this way, the passenger in the second other vehicle can clearly perceive the intention of the vehicle (i.e., the intention of the vehicle to enter the space between the first other vehicle and the second other vehicle) by visually recognizing the aspect that the length of the light pattern is increased depending on the increase in the interval between the two other vehicles. Therefore, it is possible to provide the vehicle illumination system capable of implementing rich visual communication between the vehicles upon the change of the traffic lanes.

Moreover, when the vehicle changes the traffic lane from the first traffic lane to the second traffic lane, the illumination controller may change the length of the light pattern in a traveling direction of the second traffic lane, depending on the interval.

According to the above configuration, the length of the light pattern in the traveling direction of the second traffic lane is changed, depending on the interval between the first other vehicle and the second other vehicle traveling on the second traffic lane. In this way, the passenger in the second other vehicle can visually recognize more clearly the aspect that the length of the light pattern is changed depending on the interval between the two other vehicles.

Moreover, when the interval is greater than a predetermined value, the illumination controller may control the illumination unit to irradiate the light pattern on the road surface between the first other vehicle and the second other vehicle. And when the interval is equal to or smaller than the predetermined value, the illumination controller may control the illumination unit to irradiate the light pattern on the first other vehicle.

When the interval between the two other vehicles is narrow (when the interval is equal to or smaller than a predetermined value), it is difficult for the passenger in the second other vehicle to perceive the light pattern irradiated on the road surface between the first other vehicle and the second other vehicle. In the meantime, according to the above configuration, when the interval is narrow, the light pattern is irradiated on the first other vehicle. In this way, even when the interval is narrow, the passenger in the second other vehicle can clearly perceive the intention of the vehicle (i.e., the intention of the vehicle to enter the space between the first other vehicle and the second other vehicle) by visually recognizing the light pattern irradiated on the first other vehicle.

Moreover, when the vehicle changes the traffic lane from the first traffic lane to the second traffic lane, the light pattern may be irradiated on the road surface between the first other vehicle and the second other vehicle so that the light pattern is not to be irradiated to the first other vehicle and the second other vehicle.

According to the above configuration, the light pattern is irradiated on the road surface between the first other vehicle and the second other vehicle so that it is not irradiated to the first other vehicle and the second other vehicle. In this way, it is possible to prevent the glare light from being irradiated to the passengers in the first other vehicle and the second other vehicle and to clearly transmit the intention of the vehicle (i.e., the intention of the vehicle to enter the space between the first other vehicle and the second other vehicle) to the passenger in the second other vehicle.

Moreover, a maximum value of the length of the light pattern may be associated with an entire length of the vehicle.

According to the above configuration, since the maximum value of the length of the light pattern is associated with the entire length of the vehicle, the passenger in the second other vehicle can clearly perceive the intention of the vehicle (i.e., the intention of the vehicle to enter the space between the first other vehicle and the second other vehicle) by visually recognizing the light pattern having the length associated with the entire length of the vehicle.

Moreover, the first traffic lane may be a merging traffic lane and the second traffic lane may be a main traffic lane.

According to the above configuration, the length of the light pattern irradiated on the road surface between the first other vehicle and the second other vehicle is changed, depending on the interval between the first other vehicle and the second other vehicle traveling on the main traffic lane. In this way, the passenger in the second other vehicle can clearly perceive the intention of the vehicle to enter the space between the first other vehicle and the second other vehicle by visually recognizing the aspect that the length of the light pattern is changed depending on the interval between the two other vehicles. Therefore, it is possible to provide the vehicle illumination system capable of implementing rich visual communication between the vehicles at the merging point.

A vehicle including a vehicle illumination system, which is capable of traveling in an autonomous driving mode, is provided.

According to the above configuration, it is possible to provide the vehicle capable of implementing rich visual communication between the vehicles upon the change of the traffic lanes.

According to the present disclosure, it is possible to provide the vehicle illumination system and the vehicle capable of implementing rich visual communication between the vehicles upon the change of the traffic lanes.

The invention claimed:

1. A vehicle illumination system provided to a vehicle capable of traveling in an autonomous driving mode, the vehicle illumination system comprising:
   an illumination unit configured to emit a light pattern toward an outside of the vehicle; and
   an illumination controller configured to control the illumination unit to irradiate the light pattern to a predetermined position,
   wherein when the vehicle changes a traffic lane from a first traffic lane to a second traffic lane, the illumination controller:
      controls the illumination unit to irradiate the light pattern on a road surface between a first other vehicle traveling on the second traffic lane and a second other vehicle which is a following vehicle of the first other vehicle; and
      changes a length of the light pattern, depending on an interval between the first other vehicle and the second other vehicle.

2. The vehicle illumination system according to claim 1, wherein when the vehicle changes the traffic lane from the first traffic lane to the second traffic lane, the illumination controller increases the length of the light pattern, depending on an increase in the interval.

3. The vehicle illumination system according to claim 1, wherein when the vehicle changes the traffic lane from the first traffic lane to the second traffic lane, the illumination controller changes the length of the light pattern in a traveling direction of the second traffic lane, depending on the interval.

4. The vehicle illumination system according to claim 1, wherein
   when the interval is greater than a predetermined value, the illumination controller controls the illumination unit to irradiate the light pattern on the road surface between the first other vehicle and the second other vehicle, and
   when the interval is equal to or smaller than the predetermined value, the illumination controller controls the illumination unit to irradiate the light pattern on the first other vehicle.

5. The vehicle illumination system according to claim 1, wherein when the vehicle changes the traffic lane from the first traffic lane to the second traffic lane, the light pattern is irradiated on the road surface between the first other vehicle and the second other vehicle so that the light pattern is not to be irradiated to the first other vehicle and the second other vehicle.

6. The vehicle illumination system according to claim 1, wherein a maximum value of the length of the light pattern is associated with an entire length of the vehicle.

7. The vehicle illumination system according to claim 1, wherein the first traffic lane is a merging traffic lane and the second traffic lane is a main traffic lane.

8. A vehicle comprising a vehicle illumination system and capable of traveling in an autonomous driving mode, the vehicle illumination system comprising:
   an illumination unit configured to emit a light pattern toward an outside of the vehicle; and
   an illumination controller configured to control the illumination unit to irradiate the light pattern to a predetermined position,
   wherein when the vehicle changes a traffic lane from a first traffic lane to a second traffic lane, the illumination controller:

controls the illumination unit to irradiate the light pattern on a road surface between a first other vehicle traveling on the second traffic lane and a second other vehicle which is a following vehicle of the first other vehicle; and changes a length of the light pattern, depending on an interval between the first other vehicle and the second other vehicle.

* * * * *